Feb. 27, 1973　　　H. A. STOVER　　　3,718,766
WIDE BAND MULTIPLEXING SYSTEM

Filed July 30, 1971　　　7 Sheets-Sheet 1

INVENTOR
HARRIS A. STOVER
BY　R. W. Anderson
AGENT

INVENTOR
HARRIS A. STOVER
BY R.W Anderson
AGENT

Feb. 27, 1973    H. A. STOVER    3,718,766
WIDE BAND MULTIPLEXING SYSTEM
Filed July 30, 1971    7 Sheets-Sheet 3

INVENTOR
HARRIS A. STOVER
BY R. W. Anderson
AGENT

3,718,766
WIDE BAND MULTIPLEXING SYSTEM
Harris A. Stover, Cedar Rapids, Iowa, assignor to Collins Radio Company, Cedar Rapids, Iowa
Filed July 30, 1971, Ser. No. 167,728
Int. Cl. H04j 1/20
U.S. Cl. 179—15 BM                      12 Claims

ABSTRACT OF THE DISCLOSURE

A communications system employs tandem phase modulation for multiplexing narrow band analog data with very high speed digital data. The narrow band data is applied as linear phase modulation of the system carrier, while the high speed digital data is applied as phase-shift modulation of the carrier.

A demodulator employing carrier frequency multiplication and phase locked loop techniques permits the two data channels to be separably recovered at the receiver.

This invention relates generally to communication systems and more particularly to a communication system permitting transmission and reception of narrow band data simultaneously with wide band data on the same transmission link.

More particularly, the present invention relates to a communication system employing a method for multiplexing one or more channels of narrow band analog data, such as voice, or slow speed digital data, with very high speed digital data in a manner which is simpler and more economical than known such systems.

A need may arise, particularly in the future, to transmit data derived from a single source at speeds of many megabits per second. For example, the source of data might be high-definition photographic, radar or holographic images. It may be desirable to accompany this high speed data with narrow band analog information, such as a voice channel. In general, it would be very expensive and undesirable to supply otherwise unneeded high speed digital multiplexing and high speed demultiplexing equipment just for this narrow band analog data if simpler, more economical methods could be provided.

With this end in mind, the system of the present invention is a method for multiplexing one or more channels of narrow band analog or digital data with a single channel of very high data rate digital data and recovering them separately at the receiver.

Considering the general problem of multiplexing one or more channels of relatively narrow band analog information with a very high speed digital data link, known methods of accomplishing this end may convert the analog information to digital form and digitally multiplex the analog information with the high speed digital data for transmission with the receiving end of the communication link digitally demultiplexing the received information and providing digital-to-analog conversion to return it to its original form. The use of analog-to-digital conversion, digital-to-analog conversion, very high speed digital multiplexing and demultiplexing can be expensive and undesirable. This is particularly true in a situation where there is no other requirement for a high speed digital multiplexer and there is a large ratio of the digital data rate to the analog information rate. That is, the digital data rate may be several megabits per second and the analog signal may be a simple voice channel used for voice communications between operators at the terminals.

In a further example, the analog channel may be used for low information rate monitoring of certain functions on an unmanned satellite that are totally foreign to the high data rate digital channel. Further, the high information rate digital channel may be entirely devoted to a single information source with no digital multiplexing. This latter situation might occur if the digital channel were used for high resolution photographic, radar, or holographic information transmitted at tens or hundreds of megabits per second. Under these conditions, there would be no requirement for a very high speed digital multiplexer except to handle the digitalized narrow band analog information. Therefore, it would be very undesirable to add this very high speed digital multiplexer to a communication system only in order to provide some low information rate analog information, if there were a much simpler and less expensive method of handling the problem.

It is also quite desirable for the multiplexed signal not to depend on amplitude variations to convey information because of the convenience and high efficiency of saturated amplifiers when using microwave RF carriers. Microwave carriers usually are required for RF transmission of very high data rates.

Accordingly, a primary object of the present invention is to more advantageously fulfill the above criteria by providing a simple method of multiplexing and demultiplexing low information rate analog information with high data rate digital data.

A further object of the present invention is to provide a means for multiplexing one or more channels of narrow band analog or digital data with a single channel of very high data rate digital data in a system employing phase modulation for both information channels, thus permitting the desirable usage of saturated amplifiers in microwave RF carrier links.

Known multiplexing systems which might combine narrow band analog information transmission with high data rate digital signals depend upon differences between amplitude and frequency modulation. Still other systems depend upon the position of a pulse for one channel and the width of a pulse for another channel, etc. for channel separation. Neither of these known systems is satisfactory for very high data rates.

Still other systems employ combinations of amplitude and phase modulation in order to separate the two channels at the receiving location. These systems, in employing amplitude modulation in one channel or the other, are not compatible with the desirable usage of saturated amplifiers in RF microwave carrier systems.

By contrast, the system of the present invention is featured in the provision for phase modulating both the analog and digital channels, resulting in a constant amplitude signal which may be used with highly efficient saturated RF amplifiers.

The present invention is further generally featured in the provision of a system permitting an extremely high digital data rate compared with the bandwidth of the multiplexed analog channel. The present invention is further featured in the provision for applying both the analog and digital communication data as phase modulation directly to the system carrier. A tandem phase modulation scheme is employed which permits a highly versatile modulating arrangement at the transmitter. Since the order of tandem phase shifts does not change the resulting combined phase shift, the narrow band channel modulator may either precede or follow the high speed data modulator, while the method of separating the data channels at the receiver is standardized and simplified.

Still further objects and features of the present invention will become apparent upon reading the following description with reference to the accompanying drawings in which.

Figure 3:
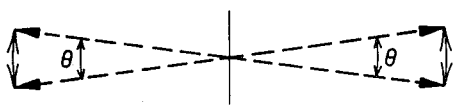
Figure 6:
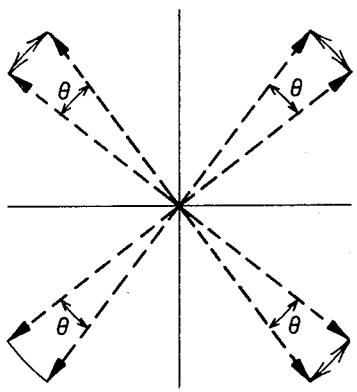
Figure 19:
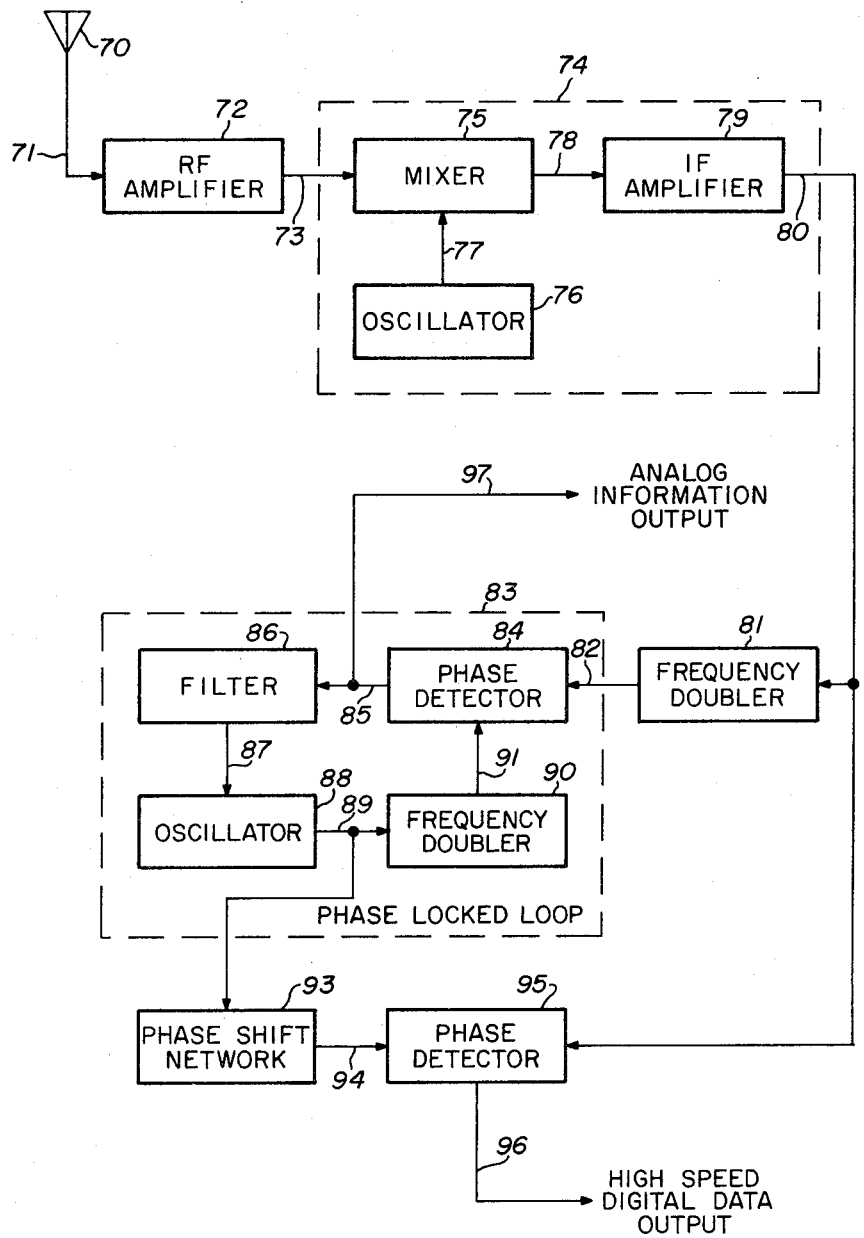
Figure 20:
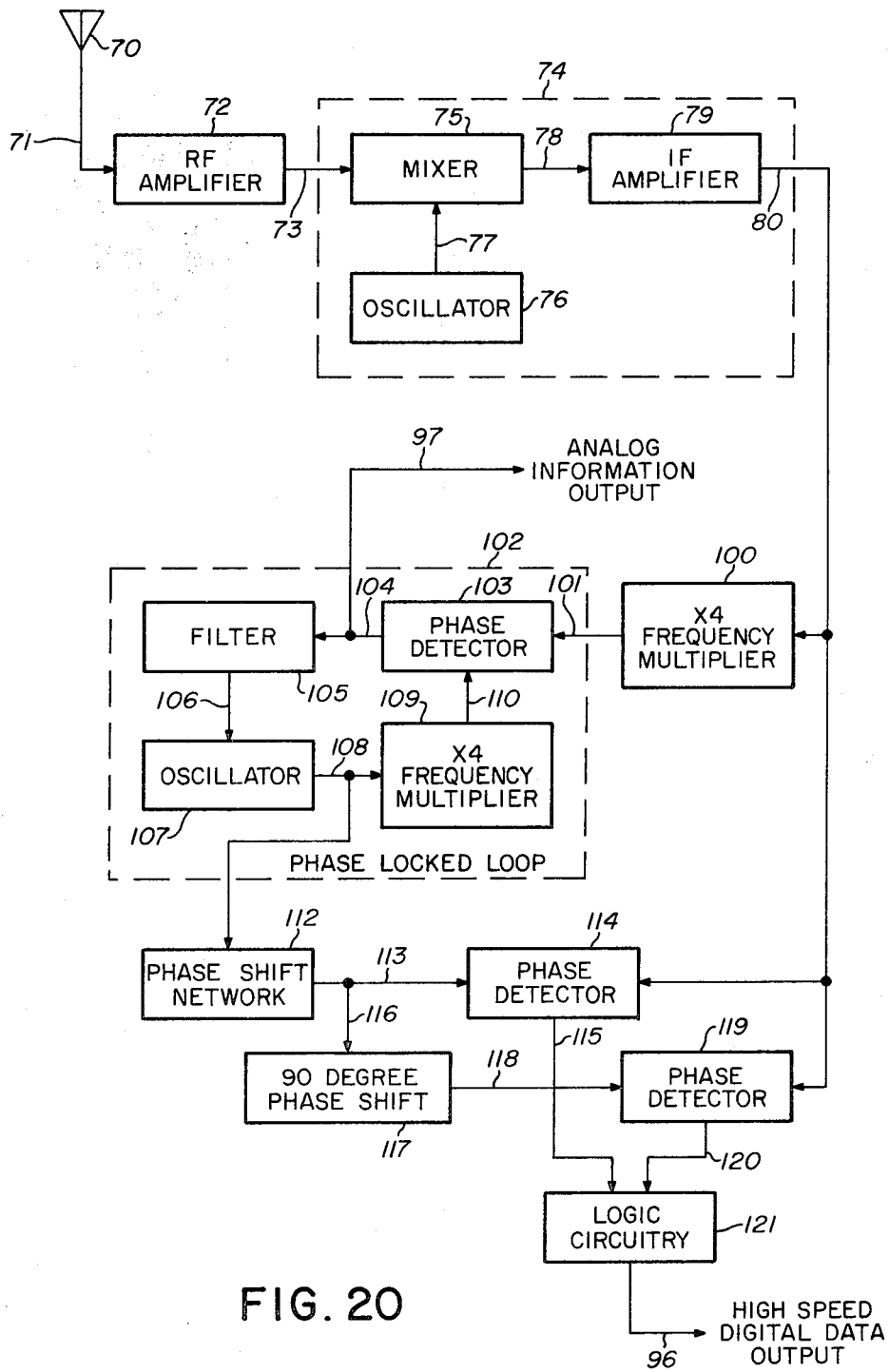

FIG. 19 is a functional diagram of a simplified receiving system for separating and demodulating the high speed digital data and analog information for signals of the type illustrated by FIG. 3 which employ biphase modulation of digital data; and FIG. 20 is a block diagram of a simple receiving system for separating and demodulating the high speed digital data and analog information from signals of the type illustrated in FIG. 6 which employ quadraphase modulation of digital data.

As generally described above, the present invention relates to a communication system permitting multiplexing one or more channels of narrow band analog or digital data with a single channel of very high rate digital data and recovering these information channels separately at the receiver. The method employed in the transmitter of the present invention consists of two modulators in tandem wherein each of the information channels is conveyed as phase modulation, thus permitting versatility in the arrangement of tandem modulation functions since the order of tandem phase shift does not change to resulting combined phase shift.

The concept of the present invention may best be comprehended by reference to the phasor diagrams of FIGS. 1 through 7.

Figure 1:
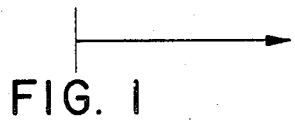
FIGS. 1–7 are phasor diagrams representing the modulation-demodulation concepts of the present invention.
Figure 2:
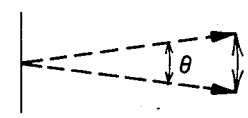

FIG. 1 represents the phase vector of a carrier frequency on which information is to be modulated. FIG. 2 illustrates diagrammatically the phase after the carrier vector has been phase modulated by analog information; that is, that phase deviation is proportional to the analog information being transmitted. Thus, the dotted lines in FIG. 2 represent the peak phase excursions due to modulation by the analog information. In accordance with the present invention the phase angle between these two dotted line vectors is selected to be compatible with the ratio of the bandwidths between the analog and digital data to be utilized in the system. Thus, for very high digital data rates and relatively low analog information bandwidths, the angle $\theta$ depicted in FIG. 2 would be quite small.

FIG. 3 diagrammatically represents the phase of the phase modulated carrier signal of FIG. 2 after the carrier has been phase modulated by analog information and then additionally biphase modulated by digital data. FIG. 3 can thus be considered to represent a signal which is identical to that represented vectorally in FIG. 2 whenever a binary "1" is transmitted, and reversed in phase from that vectorally represented in FIG. 2 whenever a binary "0" is transmitted. The same vectoral relationship of FIG. 3 is obtained and valid whether the analog modulation precedes the digital modulation or the digital modulation precedes the analog modulation. As above described, this permits flexibility in methods of implementing the hardware of the transmitter of the communication system of this invention. FIG. 3 represents one of the simplest representations of the concept of the present invention. The analog channel may consist of many forms. The analog channel may have a baseband analog signal applied directly to the phase modulator, or it may have the analog information applied to one or more subcarriers which are applied to the phase modulator, or a combination of both. As will be further described, the concept of the invention may be extended to quadraphase modulation of the carrier for digital data rather than biphase modulation as depicted vectorally in FIG. 3.

Figure 4:
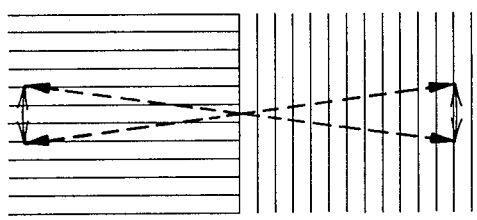

FIG. 4 is a vectoral representation illustrating the criterion for demodulating the digital data from the signal of FIG. 3. Considering that the phase of the received signal falls in the right-half plane, which is shaded with vertical lines in FIG. 4, it might be taken to be a binary "1." If the phase of the received signal falls within the left-half plane, which is shown shaded with horizontal lines in FIG. 4, it may be taken to be a binary "0." Now, if the phase deviation due to analog signal linear phase modulation is very small, it will have an insiginificant effect on the "1" or "0" decision made on the received signal. If the analog information bandwidth is very small compared with the digital data rate, the noise bandwidth of the analog channel will be very small in comparison with that of the digital channel so that the peak phase deviation $\theta$ of the analog channel can be very small.

Figure 5:
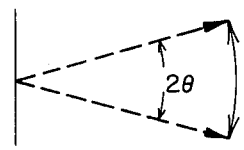

FIG. 5 illustrates the method in accordance with the present invention of separating the analog channel from the digital channel at the receiver. The second harmonic of a signal that has been shifted in phase by 180° is known to be identical to the second harmonic of a signal that has not been phase shifted. Since the digital data in accordance with the present invention is modulated onto the carrier by selecting one of the two signals which are 180° apart in phase, the second harmonic has the same phase for both "1's" and "0's." Therefore, the effect of the digital channel may be removed, leaving only the analog information. The resulting analog phase modulated signal may be demodulated in the normal manner for demodulating any analog signal. By using the second harmonic of the received signal, the peak analog phase modulation is doubled ($2\theta$) as it is applied to the input to the analog channel phase demodulator, making the signal easier to demodulate.

FIG. 6 illustrates the application of the multiplexing concept to quadrature digital modulation. The signal illustrated by the phasors of FIG. 6 may be produced either by phase modulating the carrier with the analog data prior to applying the quadrature digital data modulation, or by using the analog signal to phase modulate the signal which results from quadrature digital modulation of the carrier.

With reference to FIG. 6, if the received signal falls in the upper right-hand quadrant, the bit pair may be assigned a 1—1. If the received signal falls in the lower right-hand quadrant, it may be assigned 1—0. If it falls in the upper left-hand quadrant, it may be assigned 0—1, and if it falls in the lower left-hand quadrant, it may be assigned 0—0.

Figure 7:
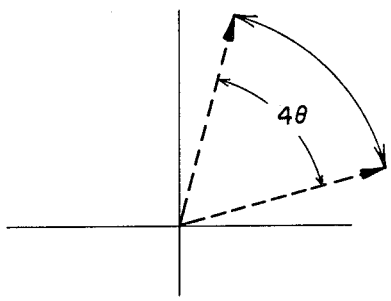

As was the case discussed with biphase modulation and the phasor diagram of FIG. 5 representing the second harmonic, the method of separating the analog channel from the quadrature digital data is depicted in FIG. 7 wherein the quadrature digital data cancels out in the fourth harmonic of the received signal, leaving only the analog channel with its peak deviation increased by a factor of four ($4\theta$). In the case of biphase modulation, the peak deviation was increased by a factor of two. Thus, the fourth harmonic signal, as represented in FIG. 7, may be demodulated in the normal manner for demodulating phase modulated analog signals to recover the analog channel information.

The concept of the present invention, again with reference to the phasor diagrams of FIGS. 1–7, may then be summarized as follows. Analog narrow band information is linearly phase modulated on the carrier of the system with peak phase excursions $\theta$ which are quite small; that is, the peak phase excursion is compatible with the ratio of the bandwidth between the analog information and digital data to be employed in the system, and for high digital data rates and relatively low analog information bandwidths, the peak phase deviation of the analog modulation is small. In tandem fashion, either preceding or following the linear phase modulation, the high speed digital data is introduced by either quadrature or biphase modulation techniques. At the receiver, the second harmonic of the biphase modulated high speed digital data channel or the fourth harmonic of the quadrature phase high speed digital data channel are employed in a separation technique to remove the biphase or quadrature phase modulation from the linear phase modulation which conveys the narrow bandwidth analog information. As will be further apparent, the unique separation method employing harmonics of the carrier frequency for demodulation purposes at the receiver actually enhances the system demodulation capability as concerns the linear phase modulated narrow bandwidth analog information, since this information is separated and the maximum phase deviation magnified by a factor of two ($2\theta$) in the case of biphase modulation of the high speed digital data and by a factor of four ($4\theta$) in the case of quadrature phase modulation of the high speed digital data.

Figure 8:
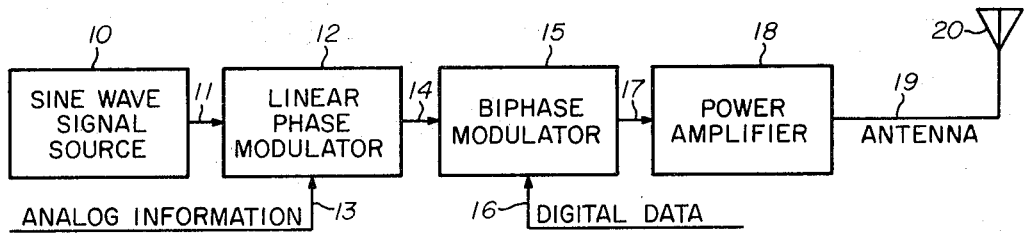
FIGS. 8 and 9 are generalized diagrams of possible transmitter tandem modulating systems combining linear modulation of the analog information and biphase modulation of digital data.

The general form for the transmitter of the present invention is depicted functionally in FIGS. 8 through 11. As above discussed, the general form employs two phase modulators in tandem. As depicted in FIG. 8, the carrier signal sine wave source 10 supplies signal 11 to a linear phase modulator 12 to which the narrow bandwidth analog information 13 may be applied. The analog information appears as a low deviation phase modulation on the carrier source at the output 14 of the linear phase modulator 12. The linear phase modulated carrier signal 14 is then applied to a biphase modulator 15 to which the high speed digital data 16 may be applied to shift the phase of the signal applied thereto such that 180° of phase shift occurs between binary "1's" and "0's." The tandem phase modulated output 17 from biphase modulator 15 may then be applied to a power amplifier 18 from which the composite phase modulated signal 19 is applied to a transmitting antenna 20.

Figure 9:
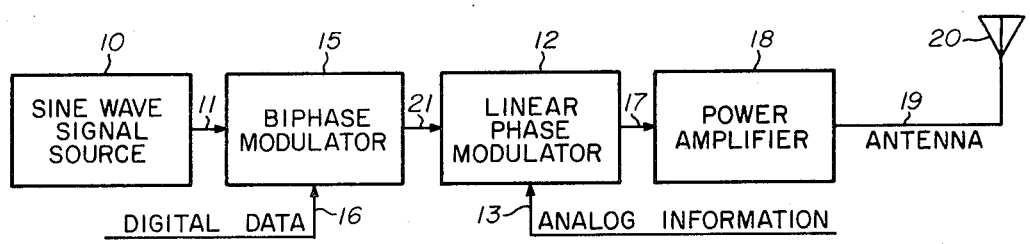

Since tandem phase modulation is employed, the general form of the transmitter of the invention does not necessitate that either of the linear phase or biphase modulators occur first in the transmitter signal path. Accordingly, FIG. 9 illustrates a further general embodiment of a transmitting system employing biphase modulation of digital data wherein the sine wave signal source 10 applies the signal 11 first to the biphase modulator 15 where it is modulated with the high speed digital data 16. The output 21 from the biphase modulator 15 is supplied then to the linear phase modulator where the phase of the signal 21 is linear phase modulated in accordance with the low bandwidth analog information 13. The output 17 from the linear phase modulator is again applied to the power amplifier 18 for application of the composite phase modulated signal 19 to the transmitting antenna 20.

Figure 10:
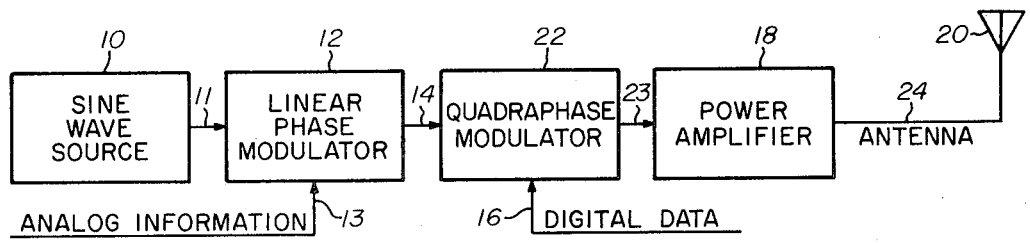
FIGS. 10 and 11 are generalized diagrams of transmitting systems employing linear modulation of analog information and quadraphase modulation of the digital data.
Figure 11:
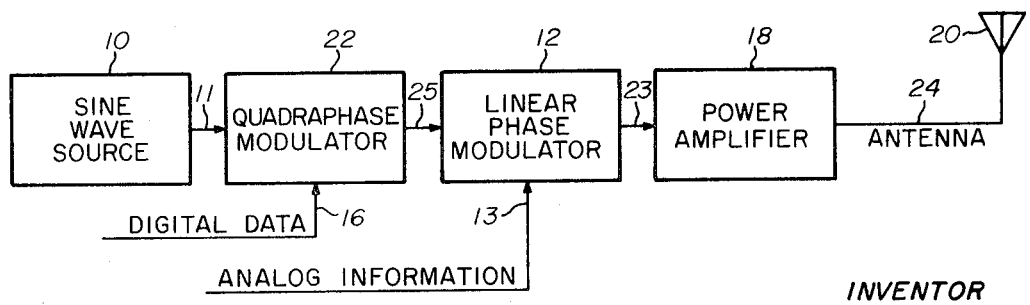

FIGS. 10 and 11 further illustrate the general transmitter configuration for systems employing quadraphase modulation as concerns the high speed digital data. Accordingly, the sine wave carrier signal source 10 is applied in FIG. 10 first to a linear phase modulator 12 where it is modulated with the narrow bandwidth analog information 13. The output 14 from the linear phase modulator 12 is applied then to a quadraphase modulator 22 where the phase is appropriately shifted in accordance with quadrature phase modulation techniques by the high speed digital data information source 16. The composite signal 23 is then applied to power amplifier 18 to develop the composite modulated output signal 24 for transmission by antenna 20. FIG. 11 illustrates a quadraphase system wherein the quadraphase modulator 22 occurs first in the signal path followed by the linear phase modulation as concerns analog information.

Although the basic transmission concepts illustrated in FIGS. 8, 9, 10, and 11 show all of the operations taking place at the transmitted carrier frequency, it is to be understood that frequency translations may be made at any point within the chain by simply adding an oscillator-mixer combination. Similarly, by properly adjusting phase deviations to compensate, frequency dividers or multipliers may be inserted.

Figure 12:
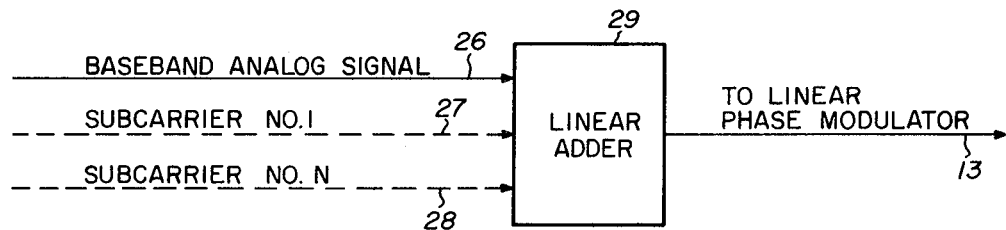
FIG. 12 is a generalized multiplexing diagram illustrating the linear addition of a number of subcarriers carrying analog information which may be applied to the linear phase modulator of the present invention.

FIG. 12 is a general diagrammatic representation illustrating the combination of plural analog channels with all of them on subcarriers or with one of them on baseband and the remaining on subcarriers. The system is completely compatible with known multiplexing techniques. As indicated in FIG. 12, one channel of narrow band width analog information might be carried by a baseband analog signal 26, while other channels 1 through "N" might be carried by subcarriers of the baseband signal. In accordance with known multiplex techniques these various channels of narrow bandwidth analog information may be applied to a linear adder 29 with the output 13 from the linear adder comprising the analog information input to the various transmission configurations of FIGS. 8–11.

The linear phase modulator 12 for the analog information in FIGS. 8, 9, 10, and 11 may employ any one of known standard voltage controlled reactances or current controlled reactances commonly employed in phase modulators. They might also employ voltage controlled or current controlled resistances in standard phase shift networks. Numerous known approaches to providing linear phase modulators are known by means of which the linear phase modulator 12 of FIGS. 8 through 11 might be implemented.

The biphase and quadraphase modulators of FIGS. 8–11 might also employ numerous implementation techniques. For example, a satisfactory transmitted signal may be attained by implementing the biphase or quadraphase modulator as a balanced modulator circuitry with the high speed rate data signal applied into one input and the carrier signal source, either linear phase modulated or directly, as the other input to the balance modulator. The output of the balance modulator will differ by 180° depending upon whether a plus or minus voltage is present at the high data rate signal input to the balance modulator.

Figure 13:
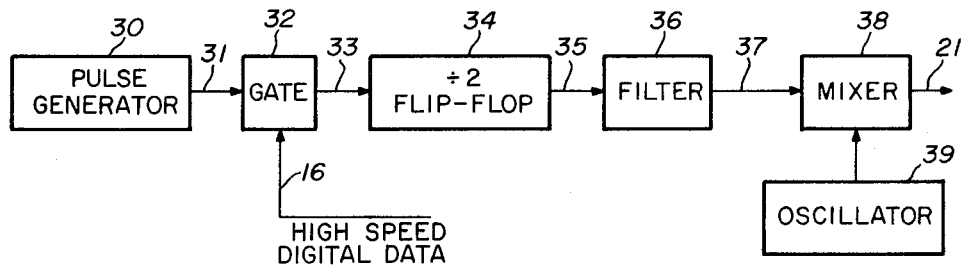
FIG. 13 is a generalized functional diagram of a digitalized biphase modulation scheme as concerns the high speed data channel.
Figure 14:
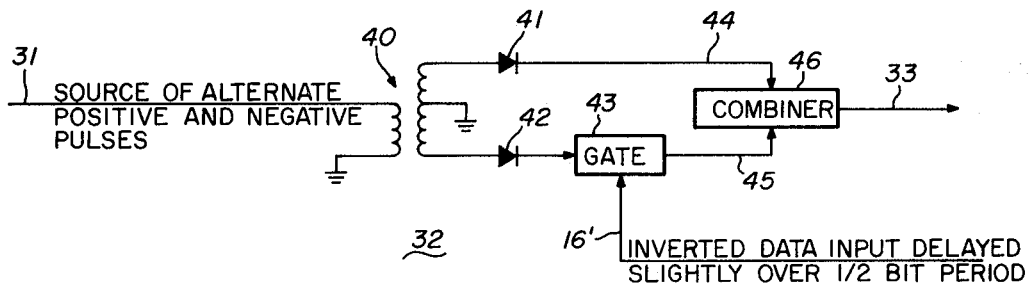
FIG. 14 is a functional schematic diagram of the gating means employed in the system of FIG. 13.

Still other implementations of the biphase modulator 15 of FIGS. 8 and 9 may require that the biphase modulation occur first in the tandem modulation scheme. For example, the biphase modulator 15 of FIG. 9 might be embodied as illustrated in FIGS. 13 and 14. The biphase digital data modulator, FIG. 13, is seen to comprise a pulse generator 30 supplying a source of alternate positive and negative pulses 31 to a gating means 32 to which the high speed digital data train (1's and 0's) is applied as a modulating input. The output from the gating means 32 is applied as an input 33 to a divide-by-two flip-flop 34. The output from flip-flop 34 is applied as an input 35 to filter 36. The output 37 of filter 36 is applied to a mixer 38 where it is mixed with the input from an oscillator 39 to provide a biphase modulated carrier waveform 21 which may be subsequently applied to the linear phase modulator 12 of the transmitting system depicted generally in FIG. 9.

Figure 15:
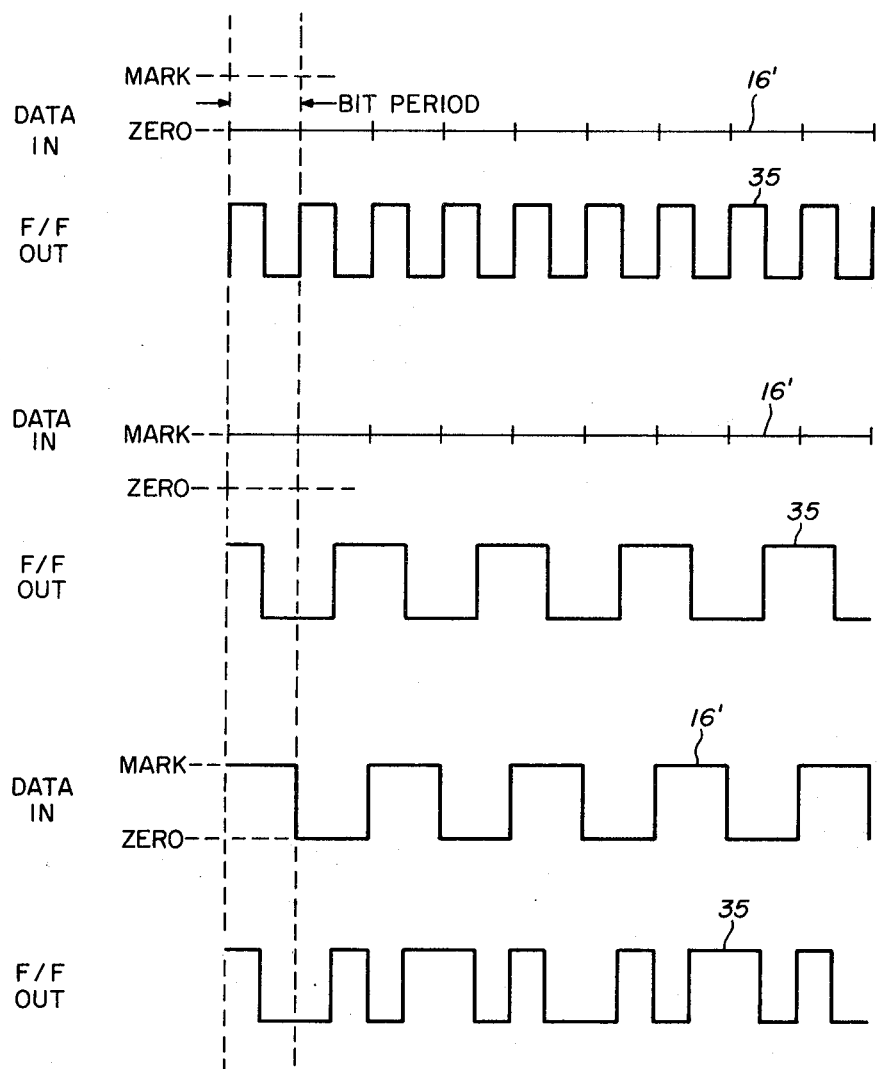
FIG. 15 represents operational waveforms of the biphase modulation system of FIGS. 13-14.

In operation, the high speed biphase modulator of FIG. 13 receives a train of pulses 31 from pulse generator 30. For purposes of example, let it be assumed that the train of pulses is twice the bit rate of the high speed data system. Gating means 32 in general operation permits these pulses to pass as long as "0's" are present in the high speed data bit train input signal 16, but inhibits one pulse for each "1" in the incoming high speed digital data 16. Since the pulse generator 30 is operating at twice the speed of the incoming digital data modulating source, two pulses in a row will never be inhibited so that there will be a limit on the lowest frequency component present. If all 0's are in the bit stream, the output of the subsequent divide-by-two flip-flop 34 would appear as depicted in the uppermost waveform of FIG. 15. If all "1's" are present in the high speed digital bit stream 16, the output of the divide-by-two flip-flop 34 would have half the transitions removed and appear as the second waveform of FIG. 15. If the high speed digital bit train 16 presents alternate "1's" and "0's," the output from the divide-by-two flip-flop 34 would appear as in the lowermost waveform of FIG. 15. The output of the divide-by-two flip-flop 34, after passing through low pass filter 36 to remove the higher frequency harmonics of the square or rectangular waves, comprises a carrier frequency either equal to the bit rate of the high speed digital data source 16 or two times the bit rate. After frequency translation by oscillator 39 and mixer 38, an RF signal is present on line 21 which is biphase modulated by the high frequency digital data.

The operation of the high speed digital data biphase modulator FIG. 13 may be better comprehended by consideration of the functioning of the gating means 32 to which the pulse generator output 31 and high speed digital data information train 16 are applied. Implementations of the inhibiting gate means 32 of the system of FIG. 13 might take a variety of forms. One such implementation is illustrated in FIG. 14.

FIG. 14 illustrates the pulse generator 31 input as being a source of alternate positive and negative pulses. The pulse train 31, operating at a repetition rate twice that of the digital data rate, is applied to a transformer 40. If the frequency response of pulse transformer 40 is very high compared with the pulse repetition rate, and its low frequency response is poor, the alternate positive and negative pulses may be generated in the secondary of the transformer 40 by applying a square wave with a frequency equal to the bit rate to the primary winding of the transformer 40.

For purposes of description, assume that the type of data applied to the gate is NRZL which, in accordance with defined standards, establishes that a "mark" is represented by one level and a "space" is represented by the other level. With this type of input for data "spaces" or "zeros" applied to input 16, the gate 32 will pass every pulse (making all of the negative pulses positive) and the output 33 of combiner 46 will contain a positive pulse for every positive and for every negative pulse at the secondary of the pulse transformer 40. However, if a "mark" or a "one" which has been inverted and delayed slightly is present at the input to the AND gate 43, it will inhibit or remove the pulse at the end of the bit period. (The pulse in the center of the bit period will always pass through diode 41.) Thus, the output of the divide-by-two flip-flop 34 of FIG. 13, to which the output of the combiner would be applied, will have two consecutive states the same at the end of one bit period and the beginning of the next for any bit period containing a "mark" or "1." This corresponds to a phase reversal or a 180° phase shift of the wave appearing at the output of filter 36 of FIG. 13. Thus, this configuration will produce a form similar to a split phase signal as defined by IRIG standards except that, instead of "marks" always having a transition in one direction in the middle bit period, and "spaces" always having a transition in the opposite direction in the middle of a bit period, "marks" are represented by a reversal in the direction of the transition in the middle of the bit period as compared to the transition in the middle of the previous bit period; while spaces are represented by the same direction of transition in the middle of the bit period as the direction of transition in the middle of the previous bit period.

If the data on input line 16' to AND gate 43 of FIG. 14 is not inverted, and the system timing is such that the pulse passing through diode 42 is the pulse that appears at the middle of the bit period, then whenever a "space" is present at the input, the transition in the middle of the bit period will be missing and the output will be of the standard biphase-mark form as defined by IRIG standards. While under the same timing conditions, if the input to AND gate 43 on line 16' is inverted, the transition in the middle of the bit period will be missing whenever a "mark" is present at the input and the standard biphase-space form defined by IRIG standards will occur at the output of the divide-by-two flip-flop 34 of FIG. 13.

Figure 16:
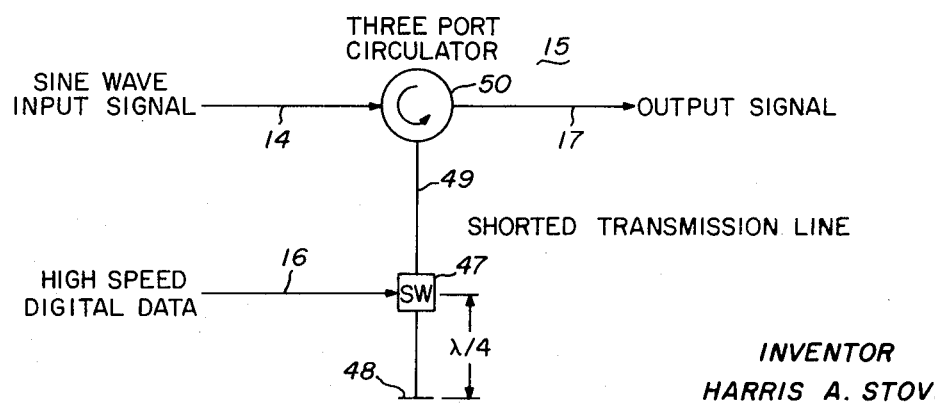
FIG. 16 represents an embodiment of a biphase modulation implementation which might be employed in the transmitting embodiment of FIG. 8.

A further method of providing the biphase modulation for the system of FIG. 8 (where the linear phase modulation as concerns analog information is first performed with the biphase modulation as concerns the digital data occurring second in the tandem phase modulation arrangement) is illustrated in FIG. 16. The system of FIG. 16 employs a three-port circulator 50 and a diode switch 47 functionally represented as being located a quarter wave from the end of a shorted transmission line 49. With this arrangement, the high speed binary data from input data line 16 may be applied to open or close the diode switch 47 and thus produce the desired 180° phase shift by causing the signal to travel one-half wavelength farther for one state of the high speed digital data 16 than for the other state of the high speed digital data.

Figure 17:
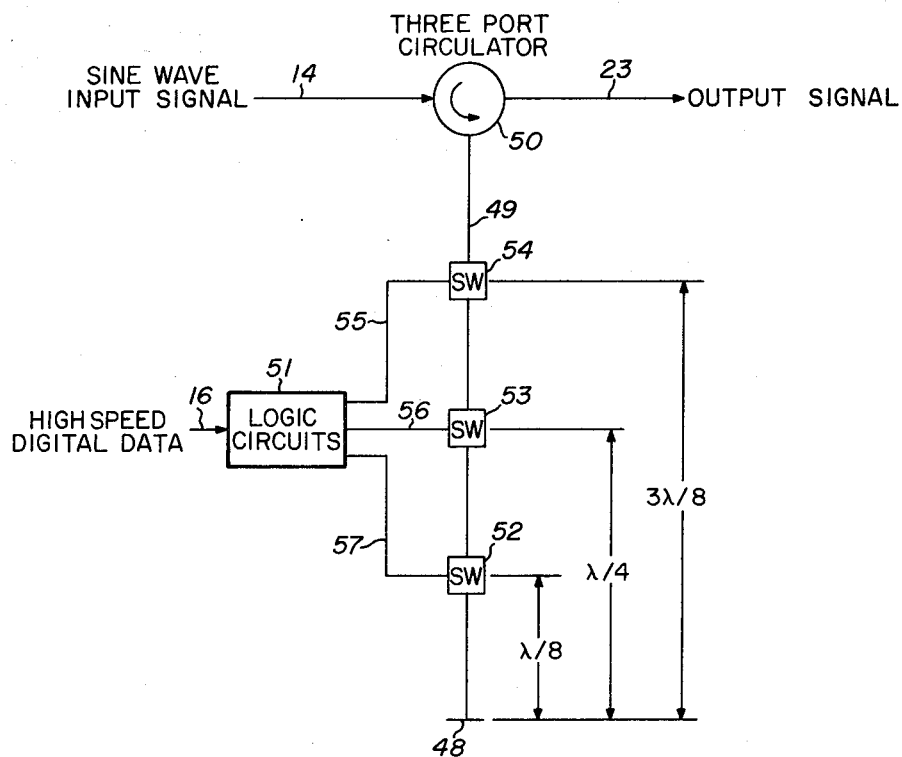
FIG. 17 is a functional representation of a quadrature phase modulator implementation which might be employed in the system of FIG 10.

A quadraphase modulator as might be employed in the quadraphase high speed digital data modulation system of FIG. 10 is illustrated functionally in FIG. 17. FIG. 17 illustrates the employment of a three-port circulator 50 to which the linear phase modulated signal 14 of the system of FIG. 10 may be applied as an input signal. The system of FIG. 17 employs three diode switches 52, 53, and 54, respectively, placed ⅛, ¼, and ⅜ wavelengths from the shorted end 48 of the transmission line 49. The quadraphase modulation is accomplished by causing the high speed digital data train 16 as applied through appropriate logic circuitry 51 to provide switching outputs 55, 56, and 57 applied to the respective diode switches and to cause signals to travel ¼, ½, and ¾ wavelengths farther than others depending upon the state of the diode switches 52, 53, and 54. Quadraphase modulation transmits digital data in bit pairs. Thus, the logic circuitry 51 of FIG. 17 would employ means to separate the incoming digital data on line 16 into bit pairs and to select which of the three diodes 52, 53, 54 to short or whether to leave them all open depending upon whether the particular bit pair is 1—1, 0—1, 1—0, or 0—0.

Figure 18:
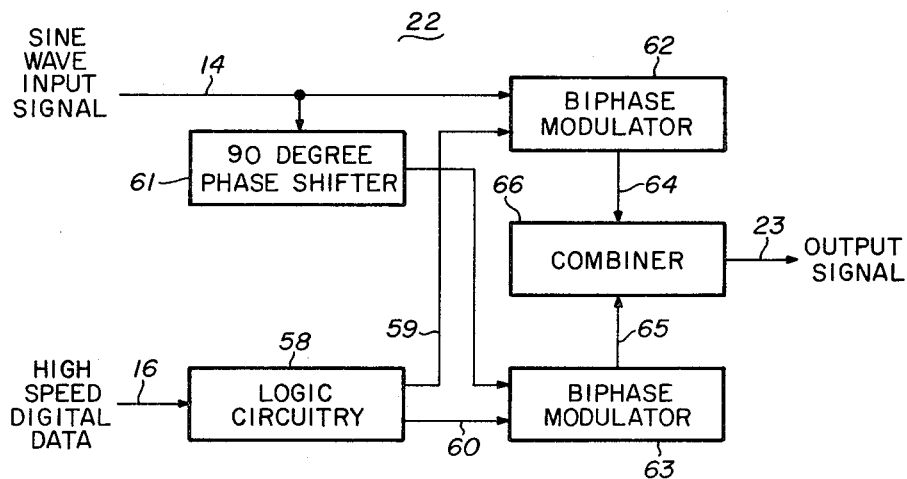
FIG. 18 is a functional block diagram of a quadraphase modulator implementation that might be employed in the transmitter system configurations of FIGS. 10 or 11.

FIG. 18 illustrates a quadraphase modulator that may be employed in the transmitting configurations of FIGS. 10 or 11. In FIG. 18, logic circuitry 58 accepts the high speed digital data input train 16 and separates the digital data input signal into bit pairs for the purpose of quadraphase modulation. The first bit of each bit pair is applied to a biphase modulator 62 which biphase modulates the input 59 thereto at a data rate which is one-half the input digital data rate. The second bit of each bit pair on the output 60 from logic circuitry 58 is applied to a second biphase modulator 63 which biphase modulates input signal 14 which has been shifted in phase by 90° by means of phase shifter 61. This second biphase modulator 63 also operates at a data rate which is one-half the data rate of the input digital data and with bit timing exactly the same as that for the first biphase modulator 62. When the outputs of these two biphase modulators 62 and 63 are combined, they produce a quadraphase modulated signal. Thus, the outputs 64 and 65 from biphase modulators 62 and 63 are applied to a combiner 66 to develop the quadraphase modulated output signal 23 which, in the trnasmitter configuration of FIG. 10, additionally bears narrowband phase deviation carrying the narrowband analog information of the system. In the transmitting configuration of FIG. 11 the input signal 14 would be signal 11, and the output would be signal 25 applied for subsequent linear phase modulation.

Since the techniques of quadraphase modulation are well developed in the art as well as those of biphase modulation, details of the logic circuitry 58 of the system of FIG. 18, and the logic circuitry 51 of FIG. 17, are not described here in detail. Circuits capable of performing necessary logic functions are readily available and may be readily implemented by those skilled in the art.

Should any of the phase modulation devices previously discussed produce incidental amplitude modulation along with the desired phase modulation, the system of the present invention, since it operates entirely on phase modulation principles, permits passing the signal through a limiter and filter prior to application to the power amplifier 18 of the basic systems outlined in FIGS. 8–11.

The tandem phase modulation technique, by means of which the two channels of information are transmitted in the system of the present invention, permits the unique and relatively simple detection means at the receiver by means of which the two channels of information may be separated and the information in the channels recovered. Since the transmission system carries the high speed digital data information as 180° phase shifts in the case of biphase modulation or of quadrature phase shifts in the case of the quadraphase modulation and considering the fact that the narrow bandwith analog data is linearly phase modulated as a low peak deviation standard phase modulation, the separation technique permits separation of the data into channels by utilizing the demodulation techniques discussed above with reference to the phasor diagrams of FIGS. 5 and 7. In the case of biphase modulation, the high speed data channel may be separated by using phase locked loop techniques operating on the second harmonic of the received signal to double the peak linear phase deviation as indicated in the phasor diagram of FIG. 5; or in the case of quadraphase modulation at the transmitter, operating on the fourth harmonic of the received signal to increase the peak linear phase deviation by a factor of four as indicated in the phasor diagram of FIG. 7.

Reference is made to FIG. 19 which functionally represents a receiving system for separation and recovery of the analog and high speed digital data information channels where the transmitted signal employs biphase modulation as concerns the high speed data channel. The receiving system of FIG. 19 includes an antenna 70 from the received tandem phase modulated carrier signal 71 is applied as an input to an RF amplifier 72. The mixer 75, oscillator 76, and IF amplifier 79 blocks, collectively identified by reference numeral 74, may be included, or in some cases omitted, since the subsequent demodulation circuitry may in some cases operate directly at the carrier frequency. Thus, as indicated in FIG. 19, the output 73 from RF amplifier 72, is applied to a mixer 75 which receives an injection signal 77 from oscillator 76. The output 78 from mixer 75 is applied to an IF amplifier 79 to develop an IF signal 80 carrying both the biphase high speed digital data modulation and the linear phase modulated analog information.

The output 80 from IF amplifier 79 (or in some systems the received and amplified carrier signal per se) is applied both to a frequency doubler 81 and a phase detector 95. The output 82 from frequency doubler 81 is applied to a phase locked loop indicated within dash lines and identified by reference numeral 83. The phase locked loop 83 comprises a phase detector 84 to which the output 82 from frequency doubler 81 is applied, a filter 86 to which the output 85 from phase detector 84 is applied, a voltage controlled oscillator 88 to which the output from filter 86 is applied and a frequency doubler 90 reeciving the output from voltage controlled oscillator 88 and applying a reference input 91 ot phase detector 84. The operation of the phase locked loop 83 is conventional in manner and in the system of the present invention, since it operates at double the frequency of the received modulated signal, serves to remove the high data rate signal. This is true because the output 91 of the frequency doubler 90, in accordance with the previously discussed concept, does not contain the high speed data whose information is conveyed by states differing in phase by 180° and, afte doubling, differ by 360°, which makes them both the same as depicted in the phasor diagram of FIG. 5. The phase locked loop 83 is locked so that the output 91 of frequency doubler 90 is 90° out of phase with the carrier component of the signal from the frequency doubler 81.

The gain of the phase locked loop 83 and the characteristics of filter 86 within the loop are chosen to provide a very narrow loop bandwidth so that the output of frequency doubler 90 tracks only the carrier frequency components of the signal from frequency doubler 81. Since the output of frequency doubler 90 serves as a reference phase for the phase detector 84 in the loop, and the reference phase is 90° out of phase with the carrier component of the signal from frequency doubler 81, the demodulated information from the analog phase modulation on the output of frequency doubler 81 will appear at the output of phase detector 84. Thus, the output 85 from phase detector 84 is applied to an output line 97 on which the analog information signal is separably recovered.

An appropriately phase shifted output from the voltage controlled oscillator 88 of the phase locked loop is utilized as a reference phase for application to phase detector 95 by means of which the high speed digital data information channel is separably recovered. Since the output of frequency doubler 81 is locked 90° out of phase with the second harmonic of the carrier frequency component from IF amplifier 79, the output of the voltage controlled oscillator 88 is locked with a definite phase relationship with respect to the original carrier frequency component. Phase shift nework 93 to which the output 89 from voltage controlled oscillator 88 is applied, is employed to provide the correct phase reference for application of the voltage controlled oscillator signal as a reference phase input 94 to phase detector 95 for demodulation of the digital data with which the receive carrier is biphase modulated. Thus, when a signal from a transmitter employing biphase modulation of high speed digital data multiplexed with low deviation analog phase modulation is received, the analog information will appear on output line 97 from phase detector 84 in FIG. 19 while the digital data will appear at the output 96 from phase detector 95. In the case of biphase modulation of the high speed digital data, the phase shift network 93 would, for example, introduce an additional 45° phase shift to the voltage controlled oscillator output signal 89 since the output 91 of frequency doubler 90 is 90° out of phase with the carrier component from the frequency doubler 81, and oscillator 88 in the phase locked loop (which is at half the frequency) is 45° out of phase, necessitating an additional 45° phase shift as introduced by phase shift network 93 to function as reference phase input for demodulation of the digital data in phase detector 95. Of course, in practical applications certain incidental phase shifts frequently exist which may also be corrected with phase shift network 93.

FIG. 20 functionally illustrates a receiving system for separating and demodulating the high speed digital data and analog information from received signals upon which the information channels are tandem phase modulated by linear and quadraphase modulation techniques. The front end of the receiver of FIG. 20 and ensuing circuitry is quite analogous to that of the receiver of FIG. 19 in that the received signal is applied to RF amplifier 72 and optionally to circuitry 74 by means of which injection oscillator 76, mixer 75, and IF amplifier 79 produce an IF carrier signal 80 from which the tandem phase modulations are to be separably recovered. In the case of the receiving system of FIG. 20, where the high speed digital data is quadraphase modulated on the received carrier, the frequency doubler 81 of the receiver of FIG. 19 (employed for biphase modulated high speed digital data) is replaced by a times-four frequency multiplier 100, while within a similar phase locked loop generally identified by reference numeral 102 in FIG. 20, the frequency doubler of the previously discussed biphase demodulating receiver is replaced by a times-four frequency multiplier 109. As in the system of FIG. 19, the times-four frequency multiplier 100 of the system of FIG. 20 removes the quadrature modulation from the received signal (as per the above discussed diagram of FIG. 7) such that the input to phase detector 103 in the phase locked loop 102 has only the analog linear phase modulation present thereon. Demodulation of the analog information is accomplished as in the receiving system of FIG. 19 and the analog information is separably recovered on output line 97 as the output from phase detector 103 in the phase locked loop.

Since the output 110 of the times-four frequency multiplier 109 in phase locked loop 102 of FIG. 20 is locked 90° out of phase with the fourth harmonic of the carrier component of the signal from IF amplifier 79, the output 108 from the voltage controlled oscillator 107 in the phase locked loop 102 has a fixed phase relationship with the carrier frequency component with the output of IF amplifier 79. Quadrature phase modulation by digital data may be considered to consist of two orthogonal biphase modulated signals sharing the same carrier frequency and using the same bit timing. In the receiving system of FIG. 20, phase shift network 112 and phase detector 114 perform the same function as described for the receiving system of FIG. 19 and demodulate one of the two orthogonal digital channels. Thus, one channel of the orthogonal digital channels is separably recovered on output 115 from phase detector 114. The output from phase shift network 112 is applied through a 90° phase shift network 117 to provide an output 118 which serves as a phase reference for a further phase detector 119 to demodulate the other of the quadrature digital channels. Thus, the output 120 from phase detector 119 separably recovers the second of the two orthogonal digital channels. Logic circuitry 121 receives each of the channels and is employed to assemble the binary pairs from phase detector 114 and phase detector 119 into a single serial data stream 96 in accordance with conventional quadraphase demodulation techniques.

The means employed in the receiving systems of FIGS. 19 and 20, in employing frequency doubling and quadrupling to separate the analog information output, enhance the recovery of the linear phase modulated analog information, since the peak linear phase deviation in the systems using biphase modulated digital data is doubled at the receiver for detection purposes, while the peak linear phase deviation in the systems using quadraphase modulated digital data is quadrupled at the receiver. The narrow band small-deviation phase modulation which is compatible so as not to interfere with the quadraphase and biphase shifts employed for digital data transmission purposes thus is magnified to a respectable level for the employment of phase locked loops for linear phase demodulation in the receiving systems.

It might further be noted that the communication system of the present invention lends itself for usage as a rather simple method of providing communication privacy. The system, for example, might be employed utilizing random bits in the high speed data channel to provide a method of message concealment wherein the message to be concealed is linear phase modulated on a narrow bandwidth analog subcarrier channel.

Although the present invention has been described with respect to particular embodiments thereof, it is not to be so limited as changes might be made therein which fall within the scope of the invention as defined in the appended claims.

I claim:

1. A communication system for simultaneous transmission and reception of an analog narrow band intelligence source and a high speed digital data source, comprising transmitting means, said transmitting means comprising first and second tandem connected phase modulation means, a carrier frequency source, one of said phase modulation means comprising a linear phase modulator to which said narrow band intelligence source is applied as a modulating input, the second one of said phase modulation means comprising a phase shift modulator to which said high speed data source is applied as a modulating input, said second phase modulation means being adapted to modulate the input thereto with said high speed data source data as discrete carrier phase shift excursions of 360/N degrees where N is an integer, one of said phase modulation means having applied as input thereto said carrier frequency source, the other of said phase modulation means having the phase modulated output of the other of said phase modulation means applied as carrier input thereto, whereby said first and second phase modulation means collectively develop a carrier signal tandem phase modulated in accordance with said modulating sources; signal receiving means, said receiving means comprising first and second phase detecting means to which said received tandem phase modulation carrier is applied as a first input thereto; a first one of said receiver phase detecting means comprising a first frequency multiplying means multiplying said receive carrier signal by a factor of N, a phase detector to which the output of said multiplying means is applied as a first signal input, low pass filtering means receiving the output from said phase detector, a voltage controlled oscillator receiving the output of said low pass filter as a frequency controlling input thereto, a second frequency multiplier of factor N receiving the output of said voltage controlled oscillator, said phase detector receiving the outputs of said first and second frequency multiplier, as respective inputs thereto, said narrow bandwidth intelligence source being recovered as the output of said phase detector; said second phase detecting means comprising a further phase detector receiving said tandem phase modulated carrier signal and the output of said voltage controlled oscillator as respective inputs thereto, the output of said second phase detector comprising said high speed digital data.

2. A communication system as defined in claim 1 wherein said transmitter phase shift modulation means comprises a biphase modulator whereby said integer N is defined as the integer 2, and said receiver first and second frequency multiplying means comprising frequency doublers.

3. A communication system as defined in claim 1 wherein said transmitter phase shift modulation means comprises a quadraphase modulator whereby said integer N is defined as the integer 4, and said receiver first and second frequency multiplying means comprising frequency quadruplers.

4. A communication system as defined in claim 1 wherein $\theta$ is the maximum phase deviation angle of said linear phase modulator and NR is less than 360/N degrees. phase modulator and $N\theta$ is less than 360/N degrees.

5. A communication system as defined in claim 1 wherein said receiving means comprises phase shifting means to which the output from said voltage controlled oscillator is applied and which introduces an additional phase shift of $$90 \frac{(N-1)}{N}$$

degrees, the output of said further phase shifting means being applied as reference phase to said second phase detecting means.

6. A communication system as defined in claim 1 wherein said high speed digital data source is comprised of random bits.

7. A communication system for simultaneous transmission and reception of a first narrow band intelligence source and a second high speed wide band data source, comprising transmitting means, said transmitting means comprising first and second tandem connected phase modulation means, a carrier frequency source, one of said phase modulation means comprising a linear phase modulator to which said first narrow band intelligence source is applied as a modulating input, the second one of said phase modulation means comprising a phase shift modulator to which said second high speed data source is applied as a modulating input, said second phase modulation means being adapted to convey said high speed binary intelligence source data as discrete carrier phase shift excursions defined as 360/N degrees where N is an integer, one of said phase modulation means having applied as input thereto said carrier frequency source, the other of said phase modulation means having the phase modulated output of the other of said phase modulation means applied as carrier input thereto, whereby said first and second phase modulation means collectively develop a carrier-signal tandem phase modulated in accordance with said first and second modulation sources; signal receiving means, said receiving means comprising means for multiplying said phase modulated carrier frequency by the integer N, a phase locked loop; said phase locked loop comprising a phase detector, a low pass filter, a voltage controlled oscillator, and a frequency multiplier of factor N receiving the output from said voltage controlled oscillator and supplying the reference phase signal input to said loop phase detector; the output from said multiplier comprising the input signal to said phase detector, whereby said voltage controlled oscillator is phase locked 90/N degrees out of phase with respect to the carrier frequency component of the output from said frequency multiplier, the output of said loop phase detector comprising said narrow band intelligence; and a further phase detector receiving said carrier phase shifted carrier signal input as a first input thereto and the output from said voltage controlled oscillator as a reference phase input thereto and developing an output comprising said high speed digital data.

8. A communication system as defined in claim 7 in θ is the maximum phase deviation angle of said linear phase modulator and Nθ is less than 360/N degrees.

9. A communication system as defined in claim 7 wherein said receiving means comprises phase shifting means to which the output from said voltage controlled oscillator is applied and which introduces an additional phase shift of $$90 \frac{(N-1)}{N}$$

degrees, the output of said further phase shifting means being applied as reference phase to said second phase detecting means.

10. A communication system as defined in claim 7 wherein said high speed wide band data source is comprised of random bits.

11. A communication system wherein a carrier frequency source is tandem phase modulated in accordance with a first narrow band intelligence analog source and a second high speed digital data source, said narrow band inteligence being impressed by linear phase modulation techniques and said high speed digital data source being impressed by phase shift modulation means as discrete phase shifts defined as 360/N degrees where N is an integer; a receiving means comprising first means for multiplying said tandem phase shifted carrier by the integer N; a phase locked loop comprising a phase detector receiving the output from said first means for multiplying as a first input thereto, a voltage controlled oscillator, second means for multiplying the output of said voltage controlled oscillator in frequency by the digit N for application as reference input to said phase detector in said phase locked loop, whereby said voltage controlled oscillator is locked 90/N degrees out of phase with respect to the carrier frequency component of the output from said first means for multiplying as applied to said phase locked loop, the output of said loop phase detector comprising said narrow band intelligence; a second phase detecting means receiving said tandem phase modulated carrier signal as a first input thereto, means for phase shifting the output from said voltage controlled oscillator by $$90 \frac{(N-1)}{N}$$

degrees for application as reference input to said second phase detecting means, and the output of said second phase detecting means comprising said second high speed digital data.

12. A communication system as defined in claim 11 wherein said high speed digital data source is comprised of random bits.

References Cited

UNITED STATES PATENTS 3,603,882  9/1971  Wilson _____ 179—15 B M

RALPH D. BLAKESLEE, Primary Examiner

U.S. Cl. X.R.

179—15 FD

UNITED STATES PATENT OFFICE
CERTIFICATE OF CORRECTION

Patent No. 3,718,766          Dated February 27, 1973

Inventor(s) Harris A. Stover

It is certified that error appears in the above-identified patent and that said Letters Patent are hereby corrected as shown below:

Column 12, lines 63 and 64, delete --and NR is less than 360/N degrees. phase modulator--

Column 13, line 47, delete "in θ" and substitute --wherein θ--.

Signed and sealed this 10th day of July 1973.

(SEAL)
Attest:

EDWARD M. FLETCHER, JR.          Rene Tegtmeyer
Attesting Officer                Acting Commissioner of Patents